US012579366B2

(12) United States Patent
Zhou

(10) Patent No.: US 12,579,366 B2
(45) Date of Patent: Mar. 17, 2026

(54) DEVELOPMENT PLATFORM FOR FACILITATING THE OPTIMIZATION OF NATURAL-LANGUAGE-UNDERSTANDING SYSTEMS

(71) Applicant: Robert Bosch GmbH, Stuttgart (DE)

(72) Inventor: Zhengyu Zhou, Fremont, CA (US)

(73) Assignee: Robert Bosch GmbH, Stuttgart (DE)

( * ) Notice: Subject to any disclaimer, the term of this patent is extended or adjusted under 35 U.S.C. 154(b) by 263 days.

(21) Appl. No.: 17/662,896

(22) Filed: May 11, 2022

(65) Prior Publication Data

US 2023/0367966 A1 Nov. 16, 2023

(51) Int. Cl.
*G06F 40/30* (2020.01)
*G06F 3/14* (2006.01)
(Continued)

(52) U.S. Cl.
CPC ............... *G06F 40/30* (2020.01); *G06F 3/14* (2013.01); *G06F 40/166* (2020.01); *G06F 40/20* (2020.01); *G06N 5/022* (2013.01)

(58) Field of Classification Search
CPC .......... G06F 40/30; G06F 3/14; G06F 40/166; G06F 40/20; G06F 40/10; G06F 40/221;
(Continued)

(56) References Cited

U.S. PATENT DOCUMENTS 10,311,140 B1 * 6/2019 Simonson ........... G06F 16/2379
11,138,374 B1 * 10/2021 Craft ...................... G10L 15/22
(Continued)

FOREIGN PATENT DOCUMENTS

| CN | 107799116 A | * | 3/2018 | ............. G06F 40/30 |
| CN | 110781293 A | * | 2/2020 | ......... G06F 16/3329 |
| CN | 109597993 B | * | 11/2021 | ........... G06F 40/289 |

OTHER PUBLICATIONS

Bocklisch, T. et al., "Rasa: Open Source Language Understanding and Dialogue Management," 2017, arXiv:1712.05181v2, https://doi.org/10.48550/arXiv.1712.05181 (9 pages).

(Continued)

*Primary Examiner* — Paras D Shah
*Assistant Examiner* — Mulugeta Tuji Dugda
(74) *Attorney, Agent, or Firm* — Maginot, Moore & Beck LLP

(57) ABSTRACT

A method for optimizing performance of a natural language understanding model is disclosed. The method comprises receiving a plurality of training sentences, each training sentence being labeled with a respective intent from a plurality of intents, at least one portion of at least some training sentences being labeled with a respective slot type from a plurality of slot types. The method comprises determining a recommended modification to the plurality of training sentences, the recommended modification including at least one of (i) relabeling and (ii) deleting a training sentence in the plurality of training sentences. The method comprises generating a modified plurality of training sentences by performing the recommended modification to the plurality of training sentences in response to a user input received via a user interface. The method comprises training a first natural language understanding model using the modified plurality of training sentences.

20 Claims, 10 Drawing Sheets

10

Main Interface/System:

20

22 — Input Training Data

24 — Optimization (Optional)

26 — Begin Model Training

28 — Testing/Inference

Sub-system/Interface after clicking "Optimization":

30

32 — Step1: Entity Refinement (Optional)

34 — Step2: Intent Refinement (Optional)

36 — Step3: Training-Sentence Reorganization (Optional)

38 — Step4: Algorithm Comparison (Optional)

(51) Int. Cl.
    *G06F 40/166*     (2020.01)
    *G06F 40/20*     (2020.01)
    *G06N 5/022*     (2023.01)

(58) Field of Classification Search
    CPC .... G06F 40/226; G06N 5/022; G06N 3/0455;
                                             G06N 3/09
    See application file for complete search history.

(56)                   References Cited

U.S. PATENT DOCUMENTS

| | | | |
|---|---|---|---|
| 11,281,857 B1 * | 3/2022 | Craft | G06N 5/027 |
| 11,308,281 B1 * | 4/2022 | Craft | G06F 40/284 |
| 2015/0127319 A1 * | 5/2015 | Hwang | G06F 40/40 |
| | | | 704/2 |
| 2017/0228366 A1 * | 8/2017 | Bui | G06F 40/247 |
| 2019/0066713 A1 * | 2/2019 | Mesgarani | G10L 25/30 |
| 2019/0259380 A1 * | 8/2019 | Biyani | G10L 15/22 |
| 2019/0303435 A1 * | 10/2019 | Herr | G06F 16/35 |
| 2021/0256417 A1 * | 8/2021 | Kneller | G10L 15/1815 |
| 2024/0184997 A1 * | 6/2024 | Shou | G06N 3/08 |

OTHER PUBLICATIONS

Reyes, R. et al., "Methodology for the Implementation of Virtual Assistants for Education Using Google Dialogflow," 2019, Advances in Soft Computing, pp. 440-451 (12 pages).
Singh, A. et al., "Introduction to Microsoft Bot, RASA, and Google Dialogflow," 2019, Building an Enterprise Chatbot pp. 281-302, Apress, Berkeley, CA. (22 pages).

* cited by examiner

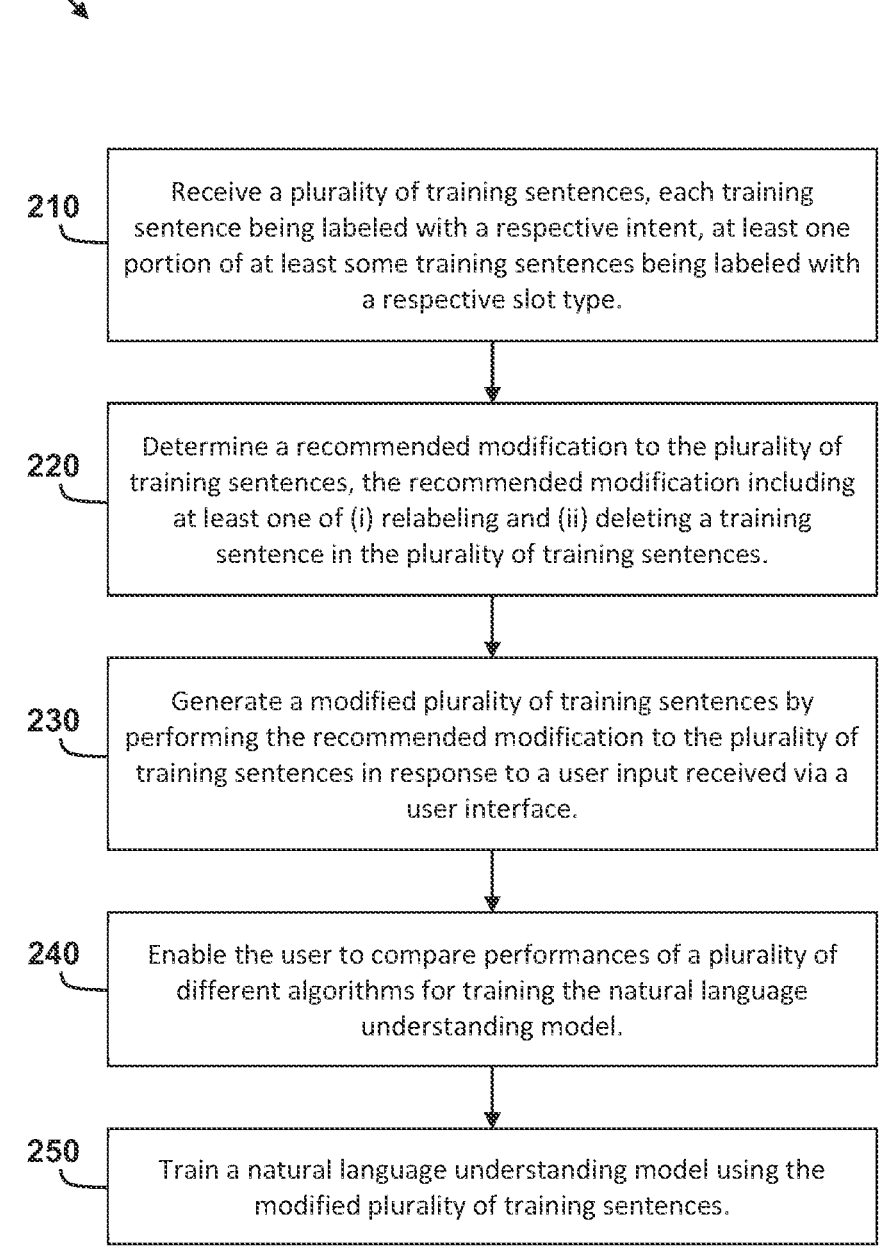

200

210  Receive a plurality of training sentences, each training sentence being labeled with a respective intent, at least one portion of at least some training sentences being labeled with a respective slot type.

220  Determine a recommended modification to the plurality of training sentences, the recommended modification including at least one of (i) relabeling and (ii) deleting a training sentence in the plurality of training sentences.

230  Generate a modified plurality of training sentences by performing the recommended modification to the plurality of training sentences in response to a user input received via a user interface.

240  Enable the user to compare performances of a plurality of different algorithms for training the natural language understanding model.

250  Train a natural language understanding model using the modified plurality of training sentences.

FIG. 3

300
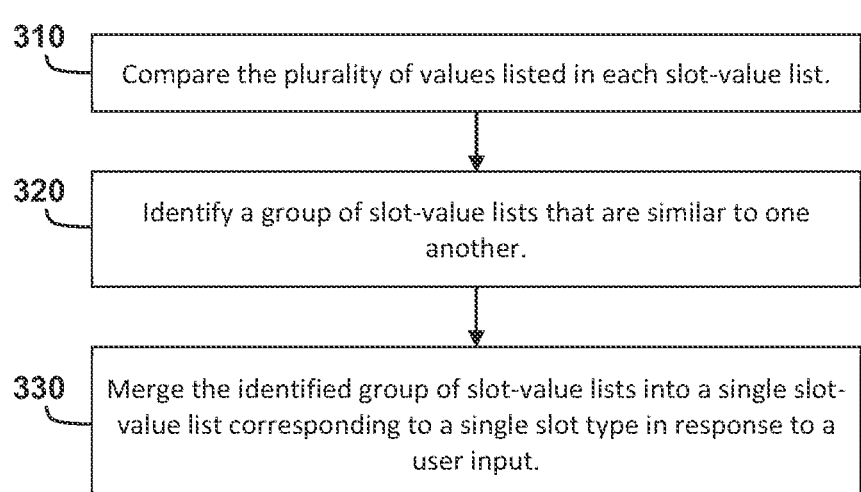
310    Compare the plurality of values listed in each slot-value list.
320    Identify a group of slot-value lists that are similar to one another.
330    Merge the identified group of slot-value lists into a single slot-value list corresponding to a single slot type in response to a user input.
FIG. 4

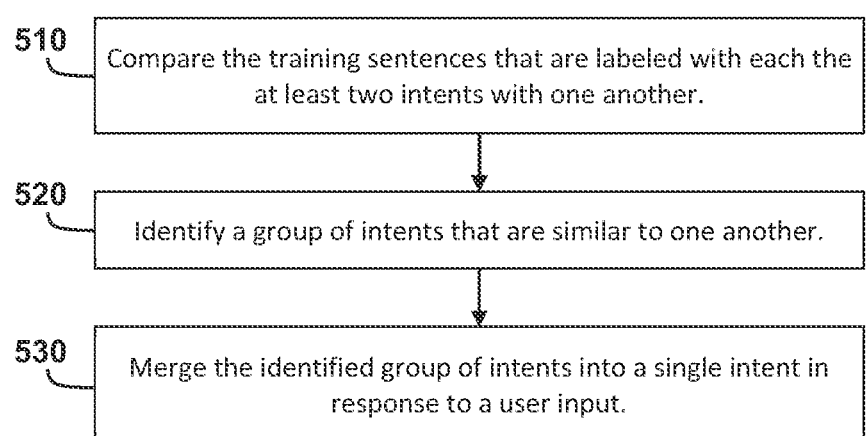
500
510    Compare the training sentences that are labeled with each the at least two intents with one another.
520    Identify a group of intents that are similar to one another.
530    Merge the identified group of intents into a single intent in response to a user input.
FIG. 6

700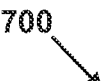
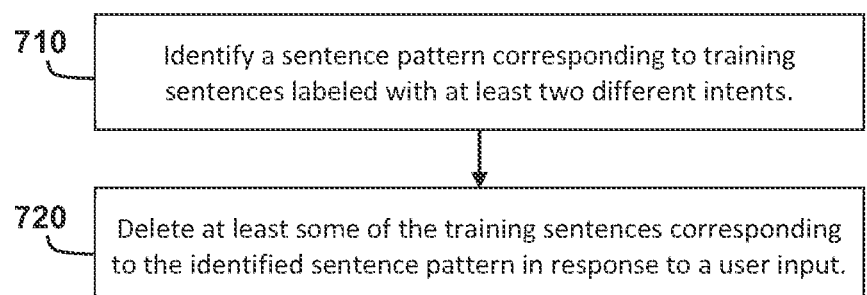
710    Identify a sentence pattern corresponding to training sentences labeled with at least two different intents.
720    Delete at least some of the training sentences corresponding to the identified sentence pattern in response to a user input.
FIG. 8

DEVELOPMENT PLATFORM FOR FACILITATING THE OPTIMIZATION OF NATURAL-LANGUAGE-UNDERSTANDING SYSTEMS

FIELD

The device and method disclosed in this document relates to natural language understanding systems and, more particularly, to a development platform for facilitating the optimization of performance of natural language understanding systems.

BACKGROUND

Unless otherwise indicated herein, the materials described in this section are not admitted to be the prior art by inclusion in this section.

Intelligent conversation systems (also referred to as dialog systems) have become increasingly popular in consumer markets especially in recent years. Text or voice-based conversation systems generally include a natural language understanding component that receives a input sentence from a user and is responsible for identifying the user's intent and the relevant slots or entities in the input sentence. The natural language understanding component is a critical part of an intelligent conversation systems that partially determines whether the system can accurately understand the user's input and thus provide a satisfactory response to the user.

Given the vast need of developing conversation systems, especially those task-specific conversation systems that support business activities, various development platforms, such as RASA and Dialogflow, have been introduced that help developers develop the natural language understanding component, optionally together with the whole conversation system. The existence of such development platforms has boosted the number of conversation systems under development and in usage.

However, the currently available development platforms for conversation systems only provide very limited functions for developing the natural language understanding component. Particularly, these development platforms primarily allow the developer to input training sentences, optionally with slot/intent information, to train a natural language understanding model using either a selected algorithm or a default algorithm. Although this simplifies development of a conversation systems, it is only suitable for small-scale applications having low complexity. In real applications, especially when a business expands, developers often need to expand the conversation system to cover an increased number of use cases and must provide more and more training data to train the natural language understanding model to handle the increased number of use cases.

As a result of the periodic expansion in the scope of use cases, the conversation system will often perform increasingly worse over time. Particularly, as the conversation system is expanded and as more and more training data is provided, the complexity of the slot/intent information increases and ambiguities in the training data emerge because the ever-expanding training data becomes disorganized. Moreover, as the conversation system is expanded, the natural language understanding algorithm used to perform intent detection and slot filling often remains the same, regardless of whether the chosen algorithm is the best option in light of the expanded scope of the conversation system (note that the best algorithm varies for data with different characteristics).

What is needed is a new development platform for natural language understanding systems that provides tools to the developer for refining intent and slot definitions, improving data organization, and supporting the selection and analysis of the best algorithm from a pool of state-of-the-art natural language understanding algorithms. It would be advantageous if the platform would not only support the development of a natural language understanding component but also make optimization of the component convenient, leading to efficient development of conversation systems with improved performance.

SUMMARY

A method for optimizing performance of a natural language understanding model is disclosed. The method comprises receiving, with a processor, a plurality of training sentences, each training sentence being labeled with a respective intent from a plurality of intents, at least one portion of at least some of the plurality of training sentences being labeled with a respective slot type from a plurality of slot types. The method further comprises determining, with the processor, a recommended modification to the plurality of training sentences, the recommended modification including at least one of (i) relabeling and (ii) deleting a training sentence in the plurality of training sentences. The method further comprises generating, with the processor, a modified plurality of training sentences by performing the recommended modification to the plurality of training sentences in response to a user input received via a user interface. The method further comprises training, with the processor, a first natural language understanding model using the modified plurality of training sentences.

A non-transitory computer-readable medium that stores a computer program for optimizing performance of a natural language understanding model is disclosed. The computer program has program instructions that, when executed by a processor, cause the processor to receive a plurality of training sentences, each training sentence being labeled with a respective intent from a plurality of intents, at least one portion of at least some of the plurality of training sentences being labeled with a respective slot type from a plurality of slot types. The computer program has further program instructions that, when executed by the processor, cause the processor to determine a recommended modification to the plurality of training sentences, the recommended modification including at least one of (i) relabeling and (ii) deleting a training sentence in the plurality of training sentences. The computer program has further program instructions that, when executed by the processor, cause the processor to generate a modified plurality of training sentences by performing the recommended modification to the plurality of training sentences in response to a user input received via a user interface. The computer program has further program instructions that, when executed by the processor, cause the processor to train a first natural language understanding model using the modified plurality of training sentences.

BRIEF DESCRIPTION OF THE DRAWINGS

The foregoing aspects and other features of method and system are explained in the following description, taken in connection with the accompanying drawings.

FIG. 3 shows a flow diagram for a method for a developing a natural language understanding model for intent detection and slot filling.

FIG. 4 shows a method for refining slot type labels in a plurality of training sentences for training a natural language understanding model.

FIG. 6 shows a method for refining intent labels in a plurality of training sentences for training a natural language understanding model.

FIG. 8 shows a method for reorganizing training sentences for training a natural language understanding model.

DETAILED DESCRIPTION

Figure 1:
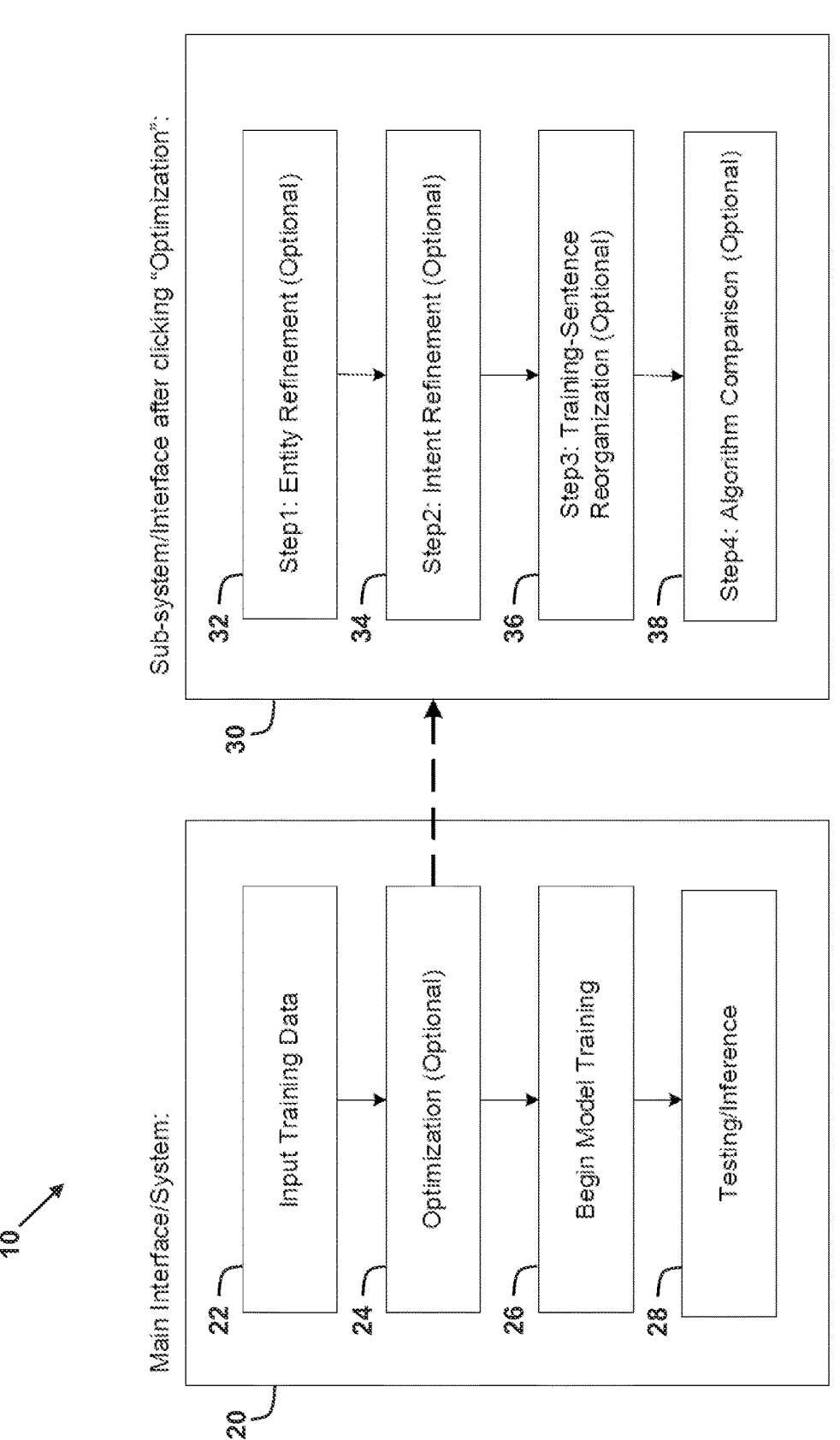
FIG. 1 shows an exemplary workflow of a development platform for developing a natural language understanding model and optimizing performance thereof.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

FIG. 1 shows an exemplary workflow 10 of a development platform for developing a natural language understanding model and optimizing performance thereof. In some embodiments, the workflow 10 is just one aspect of a comprehensive development platform for developing a task-specific conversation system that utilizes the natural language understanding model. The exemplary workflow 10 incorporates a main interface 20 and an optimization interface 30, both of which can be embodied as one or more graphical user interfaces. The main interface 20 is the primary interface of the workflow 10, whereas the optimization interface 30 is an interface for optimizing performance of the natural language understanding model.

Using the main interface 20, a user (e.g., a developer) first uploads or otherwise inputs a set of training data that will be used for training the natural language understanding model (block 22). The training data is in the form of a plurality of training sentences, which are each labeled with an intent and possibly with one of more slots. In one example, the main interface 20 has an "Input Training Data" button that, when selected by the user, provides a data-uploading interface that enables the user to upload training sentences (either by inputting the training sentences one by one or by uploading a file that contains all of the training sentences) together with the corresponding ground-truth intent labels and slot labels.

Additionally, the user may also upload relevant slot-value lists (also referred to herein as "entity lists") for certain slots or slot types.

After the training data is uploaded via the data-uploading interface, the user can return to the main interface 20 and proceed with development of the natural language understanding model. The user may optionally perform one or more optimizations (block 24), prior to beginning model training (block 26). In one example, the main interface 20 has an "Optimization" button that, when selected by the user, provides the optimization interface 30. Within the optimization interface 30, the user can utilize a variety of optimization tools including: an "Entity Refinement" tool with which the user can refine the slot-value lists and slot labels of the training sentences (block 32); an "Intent Refinement" tool with which the user can refine the intent labels of the training sentences (block 34); a "Training Sentence Reorganization" tool with which the user can adjust the organization of the training sentences (block 36); and an "Algorithm Comparison" tool with which the user can identify and select the most suitable training algorithm for training the natural language understanding model. As discussed in greater detail below, each of the optimization tools provides graphical user interfaces for simple step-by-step optimization of the natural language understanding model.

After performing optimizations using the optimization tools of the optimization interface 30 (or if the optimizations were skipped), the user can return to the main interface 20 and proceed with development of the natural language understanding model. In one example, the main interface 20 has an "Begin Model Training" button that, when selected by the user, begins training the natural language understanding model (block 26). If optimizations were performed, then the natural language understanding model is trained using the training data with the optimized intent/slot labels, optimized slot-value lists, and the selected training algorithm. However, if no optimization was performed, then the natural language understanding model is trained using the original intent/slot labels, the original slot-value lists, and a default training algorithm.

After training the natural language understanding model, the user can return to the main interface 20 and proceed with testing the natural language understanding model. In one example, the main interface 20 has a "Testing/Inference" button that, when selected by the user, provides a testing interface via which the user can conduct single-sentence inference or batch testing, in a conventional manner.

Exemplary Hardware Embodiment

Figure 2:
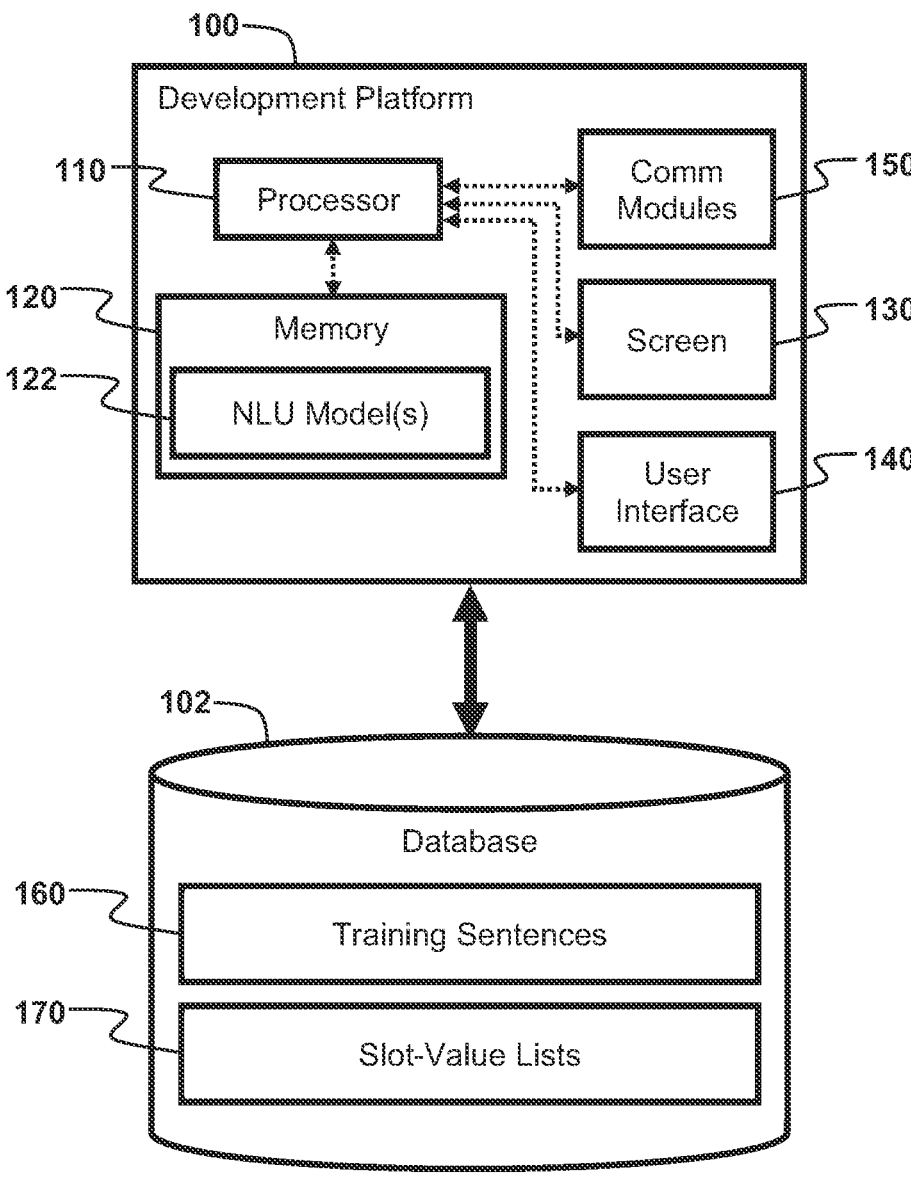
FIG. 2 shows an exemplary embodiment of a development platform for training a natural language understanding mode of an intelligent conversation system.

FIG. 2 shows an exemplary embodiment of the development platform 100 or other computing device that can be used to develop and train natural language understanding model(s) 122 for performing intent detection and slot filling within an intelligent conversation system or dialog system. The development platform 100 comprises a processor 110, a memory 120, a display screen 130, a user interface 140, and at least one network communications module 150. It will be appreciated that the illustrated embodiment of the development platform 100 is only one exemplary embodiment is merely representative of any of various manners or configurations of a server, a desktop computer, a laptop computer, or any other computing devices that are operative in the manner set forth herein. In some embodiments, the development platform 100 is in communication with a database 102, which may be hosted by another device or which is stored in the memory 120 of the development platform 100 itself.

The processor 110 is configured to execute instructions to operate the development platform 100 to enable the features, functionality, characteristics and/or the like as described herein. To this end, the processor 110 is operably connected to the memory 120, the display screen 130, and the network communications module 150. The processor 110 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 110 may include a system with a central processing unit, graphics processing units, multiple processing units, dedicated circuitry for achieving functionality, programmable logic, or other processing systems.

The memory 120 is configured to store data and program instructions that, when executed by the processor 110, enable the development platform 100 to perform various operations described herein. The memory 120 may be of any type of device capable of storing information accessible by the processor 110, such as a memory card, ROM, RAM, hard drives, discs, flash memory, or any of various other computer-readable medium serving as data storage devices, as will be recognized by those of ordinary skill in the art.

The display screen 130 may comprise any of various known types of displays, such as LCD or OLED screens, configured to display graphical user interfaces. The user interface 140 may include a variety of interfaces for operating the development platform 100, such as buttons, switches, a keyboard or other keypad, speakers, and a microphone. Alternatively, or in addition, the display screen 130 may comprise a touch screen configured to receive touch inputs from a user.

The network communications module 150 may comprise one or more transceivers, modems, processors, memories, oscillators, antennas, or other hardware conventionally included in a communications module to enable communications with various other devices. Particularly, the network communications module 150 generally includes a Wi-Fi module configured to enable communication with a Wi-Fi network and/or Wi-Fi router (not shown) configured to enable communication with various other devices. Additionally, the network communications module 150 may include a Bluetooth® module (not shown), as well as one or more cellular modems configured to communicate with wireless telephony networks.

In at least some embodiments, the memory 120 stores program instructions of the natural language understanding model(s) 122 that, once the training is performed, are configured to perform intent detection and slot filling within an intelligent conversation system or dialog system. In at least some embodiments, the database 102 stores a plurality of training sentences 160, which include natural language sentences (i.e., text) which are each labeled with a respective intent label and portions of which are labeled with respective slot labels. Additionally, in at least some embodiments, the database 102 further stores a plurality of slot-value lists 170 (also referred to as "entity lists"), each consisting of a plurality of possible values for a corresponding slot or slot type that exists in at least some of the training sentences.

Methods for Optimizing a Natural Language Understanding Model

A variety of methods and processes are described below for operating the development platform 100 or other computing device to develop and train the train natural language understanding model(s) 122 for performing intent detection and slot filling within an intelligent conversation system or dialog system. In these descriptions, statements that a method, processor, and/or system is performing some task or function refers to a controller or processor (e.g., the processor 110 of the development platform 100) executing programmed instructions stored in non-transitory computer readable storage media (e.g., the memory 120 of the development platform 100) operatively connected to the controller or processor to manipulate data or to operate one or more components in the development platform 100 or of the database 102 to perform the task or function. Additionally, the steps of the methods may be performed in any feasible chronological order, regardless of the order shown in the figures or the order in which the steps are described.

FIG. 3 shows a flow diagram for a method 200 for a developing a natural language understanding model for intent detection and slot filling. The method 200 advantageously enables the user to easily refine intent and slot definitions, improve data organization, and select the of the best natural language understanding algorithm from a pool of state-of-the-art natural language understanding algorithms. Thus, the method 200 not only supports the development of a natural language understanding model but also makes optimization of the component convenient, leading to efficient development of conversation systems with improved performance.

The method 200 begins with receiving a plurality of training sentences, each training sentence being labeled with a respective intent, at least one portion of at least some training sentences being labeled with a respective slot type (block 210). Particularly, the processor 110 receives and/or the database 102 stores a plurality of training sentences (i.e., the training sentences 160). Each training sentence comprises a natural language text string. Each training sentence is labeled with a respective intent label from a plurality of intent labels. Additionally, for some or all training sentences, at least one portion of the training sentence (e.g., a word or sequence of words within the sentence) is labeled with a respective slot type label. In an exemplary embodiment, the processor 110 operates the display 130 to display a graphic user interface (e.g., a data-uploading interface) that enables the user to upload training sentences (either by inputting the training sentences one by one or by uploading a file that contains all the training sentences) together with the corresponding ground-truth intent labels and slot type labels.

It will be appreciated by those of ordinary skill in the art that an "intent" refers to a goal, objective, task, or similar which is supported by a natural language understanding system. For example, a simple conversation system provided by a website for an airline or travel agent might support the following intents: a "Book Ticket" intent that enables a user to book an airline ticket and a "Check Flight Status" intent that enables to user to check the status of a flight. For each intent supported by the natural language understanding system, a multiplicity of training sentences are provided that are labeled with that intent.

Additionally, it will be appreciated by those of ordinary skill in the art that a "slot" refers portions of a sentence that includes critical information for fulfilling the intent of the sentence. The training sentences provided for each intent may include sentences having a variety of different sentence patterns and including a variety of exemplary critical information for fulfilling the intent. For example, the "Book Ticket" intent might include some training sentences having the sentence pattern "I want to book {NumberOfTicket} tickets to {Destination} in {TripDate}" and some training sentences having the sentence pattern "I want to get {NumberOfTicket} {TripDate} ticket to {Destination}." As can be seen, the two exemplary sentence structures have the same three slots {NumberOfTicket}, {Destination}, and {Trip-Date} that include the critical information required to are fulfill the intent of booking a ticket, but with a slightly different sentence structure. It should be appreciated that the training sentences themselves include actual exemplary text values for each labeled slot (e.g., "I want to book four tickets to Paris in June.").

Each slot (also referred to as an "entity") labeled in a sentence has a slot type (e.g., "NumberOfTicket", "Destination", and "TripDate") and a slot value (e.g., "four", "Paris", and "June"). Using various machine learning algorithms, a natural language understanding model can be trained purely based on labeled sentences and will be able to detect slot(s) (e.g., detect the portion "Paris" in the sentence "I want to book four tickets to Paris in June" as a slot with slot type "Destination" and slot value "Paris") based on sentence context during inference/testing. However, in many cases, leveraging pre-defined slot-value lists (e.g., a list of possible destination cities for the slot type "Destination") for some or all slot types in both training and testing/inference of natural language understanding model 122 with certain machine learning methods can be beneficial for performance improvement. Leveraging pre-defined slot-value list(s) is a common choice for the development of domain-specific natural language understands.

To these ends, in at least some embodiments, the processor 110 also receives and/or the database 102 also stores a plurality of slot-value lists (i.e., the slot-value lists 170). Each slot-value list defines a plurality of acceptable values for a respective slot type. For example, the {Destination} slot type may utilize a slot-value list that provides possible values for a flight destination (e.g., Paris, New York, London, etc.). As an example, the conversation system provided by an airline or travel agent might further support a "Purchase In-Flight Drink" intent that requires critical information in a {Drink_to_Order} slot type. A slot-value list may be useful to provides possible values for the {Drink-_to_Order} slot type (e.g., soda, beer, water, etc.).

It should be appreciated that, in some cases, a slot-value list may comprise an exhaustive list of all acceptable values for a particular slot type. However, in other cases, a slot value list may comprise a non-exhaustive list of acceptable values for a particular slot type, which is automatically extensible by the natural language understanding model(s) 122. Finally, it should be appreciated that not all slot types necessarily require a slot-value list. Particularly, slot types whose corresponding slot values are dates, times, or numbers generally do not require a pre-defined slot-value list for the natural language understanding model(s) 122 to accurately perform slot filling.

Finally, it should be appreciated that at least some intents do not require any slots. For example, a "Confirmation" intent might include training sentences such as "Yes." or "Sure, of course." In intents such as this, there isn't any additional critical information needed aside from simply the intent itself.

With continued reference to FIG. 3, the method 200 continues with determining a recommended modification to the plurality of training sentences, the recommended modification including at least one of (i) relabeling and (ii) deleting a training sentence in the plurality of training sentences (block 220). Particularly, the processor 110 is configured to determine or identify at least one recommended modification the plurality of training sentences 160. In some cases, the recommended modification may include relabeling an intent of one or more training sentences. In some cases, the recommended modification may include relabeling a slot, in particular a slot type, of a portion of one or more training sentences. In some cases, the recommended modification may include deleting one or more training sentences from the plurality of training sentences 160.

In an exemplary embodiment, in response to a corresponding user selection, the processor 110 operates the display 130 to display a graphic user interface (e.g., the optimization interface 30) that enables the user to interact with one or more optimization tools to identify and implement recommended modifications to the plurality of training sentences 160. Such optimizations tools for identifying and implementing recommended modifications to the plurality of training sentences 160 include the "Entity Refinement" tool, the "Intent Refinement" tool, and the "Training Sentence Reorganization" tool, introduced above and discussed in greater detail below.

FIG. 4 shows a method 300 for refining slot type labels in a plurality of training sentences for training a natural language understanding model. The method 300 corresponds generally to the "Entity Refinement" tool introduced above and advantageously helps the user identify potential problems and improve the definitions of slots or slot types (also referred to as "entities"). For example, in real-life development of an intelligent conversation system, a typical scenario is that after an initial launch of the intelligent conversation system, the scope of the intelligent conversation system grows over time to support new intents having new slots or slot types. The expansion in scope generally occurs continuously or periodically, possibly by different developers (e.g., different people may participate in the development of the intelligent conversation system over several years). This often leads to suboptimal definition of slot types and/or their corresponding slot-value lists, which will lead to poor performance of the natural language understanding model(s) 122 for the intents utilizing those slot types.

The method 300 begins with comparing the plurality of values listed in each slot-value list (block 310). Particularly, in response to a corresponding user selection via the graphical user interface, the processor 110 compares and determines a similarity between each combination of two slot-value lists. The similarity between two slot-value lists can be quantified in a variety of ways. In one embodiment, for each combination of two slot-value lists, the processor 110 quantifies the similarity by calculating an overlap ratio between the values listed in the two slot-value lists (i.e., a ratio of values that exist in both slot-value lists). The numerator of the ratio is the number of values that exist in both slot-value lists. The denominator of the overlap ratio may correspond to a total number of unique values between the two slot-value lists or to a total number of values in one of the slot-value lists. Of course, in some embodiments, multiple different overlap ratios formed with different denominators can be utilized for comparison.

In another embodiment, for each combination of two slot-value lists, the processor 110 quantifies the similarity by calculating a similarity of training sentences that are labeled with a slot type corresponding to one of the two slot-value lists. Particularly, for each sentence labeled with one of the corresponding slot types, the processor 110 determines a sentence context vector using a natural language semantics model (e.g., a neural network). The processor 110 calculates a similarity between any two sentences as a distance between the corresponding sentence context vectors. The sentence context similarity between two slot-value lists can be calculated using a variety of different statistical methods based on the corresponding sentence context vectors (e.g., average distance, etc.). In one embodiment, the processor 110 clusters the sentence context vectors using a clustering algorithm and calculates a further overlap ratio as a ratio of sentence contexts (clusters) represented the training sentences corresponding to both of the slot-value lists.

The method 300 continues with identifying a group of slot-value lists that are similar to one another (block 320). Particularly, the processor 110 identifies at least two slot-value lists that are similar to one another based on the comparison discussed above, in particular based on the quantified similarities between the slot-value lists. In one embodiment, the processor 110 identifies a pair or group of slot-value lists as being similar to one another if the overlap ratio between the pair of slot-value lists or each pair in the group of slot-value lists exceeds a predetermined threshold. In one embodiment, the processor 110 identifies a pair or group of slot-value lists as being similar to one another if the sentence context similarity (e.g., an average distance between sentence context vectors) of the pair of slot-value lists or each pair in the group pair of slot-value lists falls below a predetermined threshold (or exceeds a predetermined threshold, if a larger value indicates greater similarity).

Figure 5:
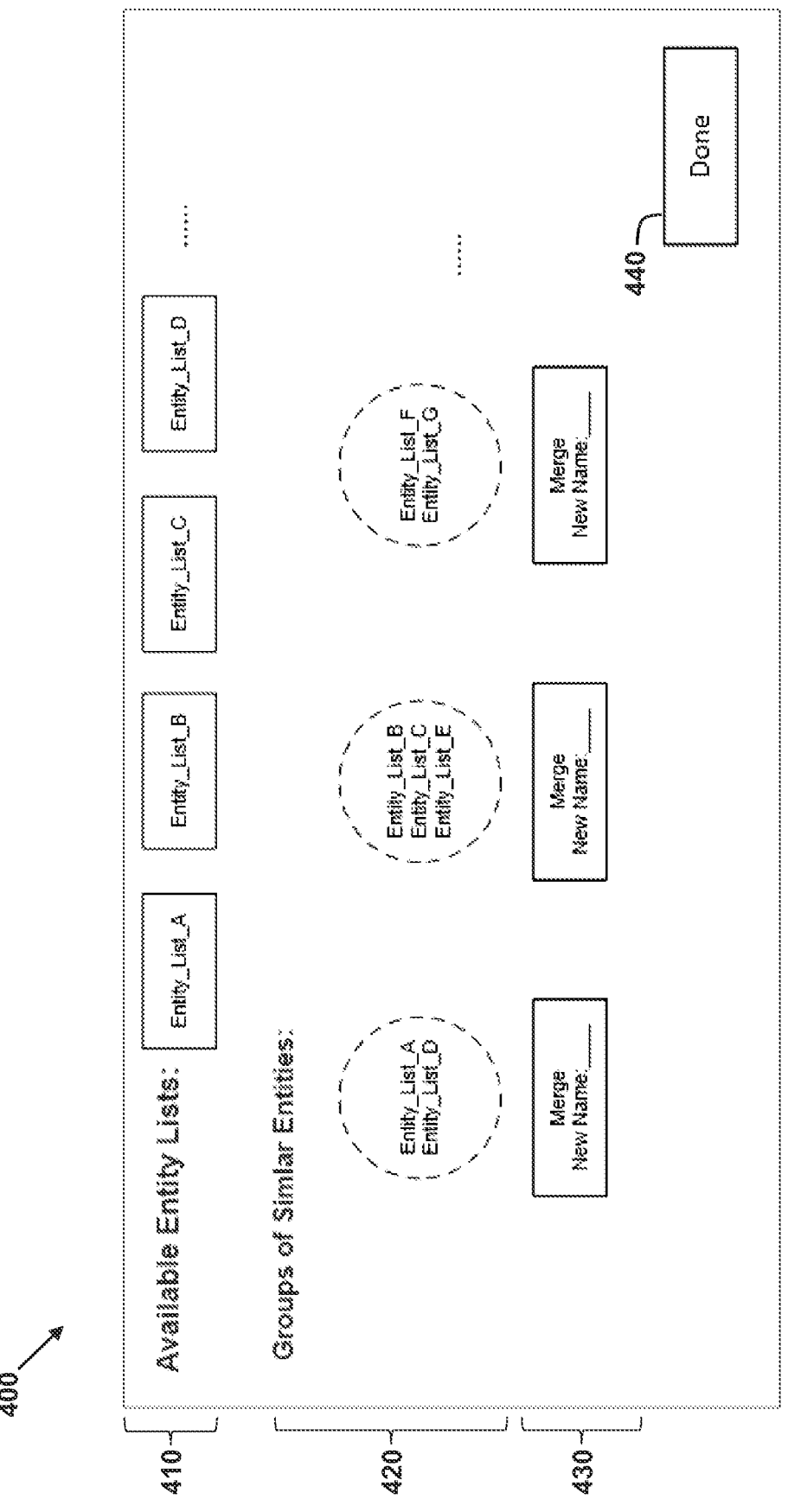
FIG. 5 shows an exemplary graphical user interface for recommending mergers of similar slot-value lists.

In further embodiments, both the overlap ratio and the sentence context similarity can be used. Particularly, in one embodiment, the processor 110 identifies a pair or group of slot-value lists as being similar to one another if the overlap ratios exceed a first predetermined threshold and the sentence context similarities falls below a second predetermined threshold (or exceeds the second predetermined threshold, if a larger value indicates greater similarity). In some embodiments, the processor 110 combines, as a weighted sum, (1) the overlap ratio of the values in each slot-value lists and (2) the overlap ratio of the sentence contexts represented the training sentences corresponding to both of the slot-value lists. The weighted sum may consist of a linear summation or the like. The processor 110 identifies a pair or group of slot-value lists as being similar to one another if the weight sum(s) exceed a predetermined threshold The method 300 continues with merging the identified group of slot-value lists into a single slot-value list corresponding to a single slot type in response to a user input (block 330). Particularly, after one or more pairs/groups of similar slot-value lists are identified, the processor 110 operates the display 130 to display a graphic user interface that displays the identified pairs/groups of similar slot-value lists to the user. FIG. 5 shows an exemplary graphical user interface 400 for recommending mergers of similar slot-value lists. In the graphical user interface 400, the available slot-value lists are displayed in a top section 410 (described as "entity lists" in the illustration). Additionally, the identified pairs/groups of similar slot-value lists are displayed to the user in a middle section 420 (e.g., by encircling the names of the entity lists with a dashed circle). Text entry fields are provided via in a lower section 430, via which the user can provide a name for a new merged slot-value list.

In response to the user confirming any of the recommended mergers (e.g., by entering a new name in the corresponding text entry field), the processor 110 is configured to combine the identified pairs/groups of similar slot-value lists into a single new slot-value list, which is stored with the slot-value lists 170. Additionally, the processor 110 relabels each portion of each training sentence in the plurality of training sentences 160 that is labeled with a slot type corresponding to one of the identified pairs/groups of similar slot-value lists with a new slot type label corresponding to the new slot-value list (i.e., with the slot type name entered by the user in the corresponding text entry field).

After performing the mergers, the processor 110 repeats the processes of blocks 310 and 320 to recalculate the similarity between the updated slot-value lists and to provide further recommendations of pairs/groups of slot-value lists that are similar to one another and which could be merged. In the graphical user interface 400, the processor 110 updates the available slot-value lists that are displayed in the top section 410 and updates the identified pairs/groups of similar slot-value lists that are displayed to the user in the middle section 420. The process can continue until the user clicks a "Done" button 440 in the graphical user interface 400 or until there are no more pairs/groups of similar slot-value lists detected. The system will then return to the optimization interface 30, via which the user can continue the next step of optimization, with the updated slot-value lists and the modified training sentences with the updated slot type labels.

FIG. 6 shows a method 500 for refining intent labels in a plurality of training sentences for training a natural language understanding model. The method 500 corresponds generally to the "Intent Refinement" tool introduced above and advantageously helps the user identify potential problems and improve the definitions of the various intents supported by the intelligent conversation system. Particularly, similar to the slot definitions, intent definitions face the same problem that confusion often increases when the application scope extends. Moreover, by way the refinement of the slot-value lists and slot type labels in the training sentences 160, additionally ambiguities with respect to the intent definitions may be revealed. For example, when the slot-value lists and slot type labels are merged, it may be revealed that the training sentences for two different intents are actually more similar to one another than they appeared to be prior to the refinement of the slot-value lists and slot type labels. As with the slot-value lists, suboptimal and confusing definition of the various intents supported by the conversation system will often lead to poor performance of the natural language understanding model(s) 122 in recognizing the intents.

The method 500 begins with comparing the training sentences that are labeled with each the at least two intents with one another (block 510). Particularly, in response to a corresponding user selection via the graphical user interface, the processor 110 compares and determines a similarity between the training sentences corresponding to each combination of two intents (e.g., a similarity between of training sentences labeled with a first intent and training sentences labeled with a second intent). The similarity between the training sentences corresponding to two different intents can be quantified in a variety of ways.

In some embodiments, the processor 110 is configured to compare and determine a similarity between the sentence patterns of the training sentences corresponding to each combination of two intents. First, for each training sentence that labeled with one of the two intents, the processor 110 determines a sentence pattern of the training sentence by substituting the slot values (i.e., the text in the sentence that is labeled with a slot type) with the slot type label itself (i.e., a name of the slot type). For example, the training sentence "I'd like to order a beer.", in which the text "beer" is labeled with the slot type "Drink_to_Order" would be converted into the sentences pattern "I'd like to order a {Drink_to_Order}." The similarity between the sentence patterns of the training sentences corresponding to two different intents can be quantified in a variety of ways.

In one embodiment, for each combination of two intents, the processor 110 quantifies the similarity by calculating an overlap ratio between the sentence patterns that exist in the training sentences labeled with each of the two intents (i.e., a ratio of sentence patterns that exist in the training sentences for both intents). The numerator of the ratio is the number of sentence patterns that exist in the training sentences for both intents. The denominator of the overlap ratio may correspond to a total number of unique sentence patterns between the two intents or to a total number of sentence patterns for one of the two intents. Of course, in some embodiments, multiple different overlap ratios formed with different denominators can be utilized for comparison.

It should be appreciated that, for a sentence pattern to exist in the training sentences for both intents or, in other words for two sentences patterns to be the "same," the sentences patterns don't necessarily need to be exactly the same, verbatim. Instead, the processor 110 can determine two sentence patterns as being the "same" if they are within a threshold similarity of one another. For example, in one embodiment, the processor 110 determines a sentence context vector for each sentence pattern using a natural language semantics model (e.g., a neural network). The processor 110 then determines that two sentence patterns are the "same" if their respective sentence context vectors are within a threshold distance from one another.

The method 500 continues with identifying a group of intents that are similar to one another (block 520). Particularly, the processor 110 identifies a pair of intents or a group of intents that are similar to one another based on the comparison discussed above, in particular based on quantified similarities between the training sentences labeled with each intent. In one embodiment, the processor 110 identifies a pair or group of intents as being similar to one another if the overlap ratio between the sentence patterns in the training sentences of the pair of intents or each pair in the group of intents exceeds a predetermined threshold.

Figure 7:
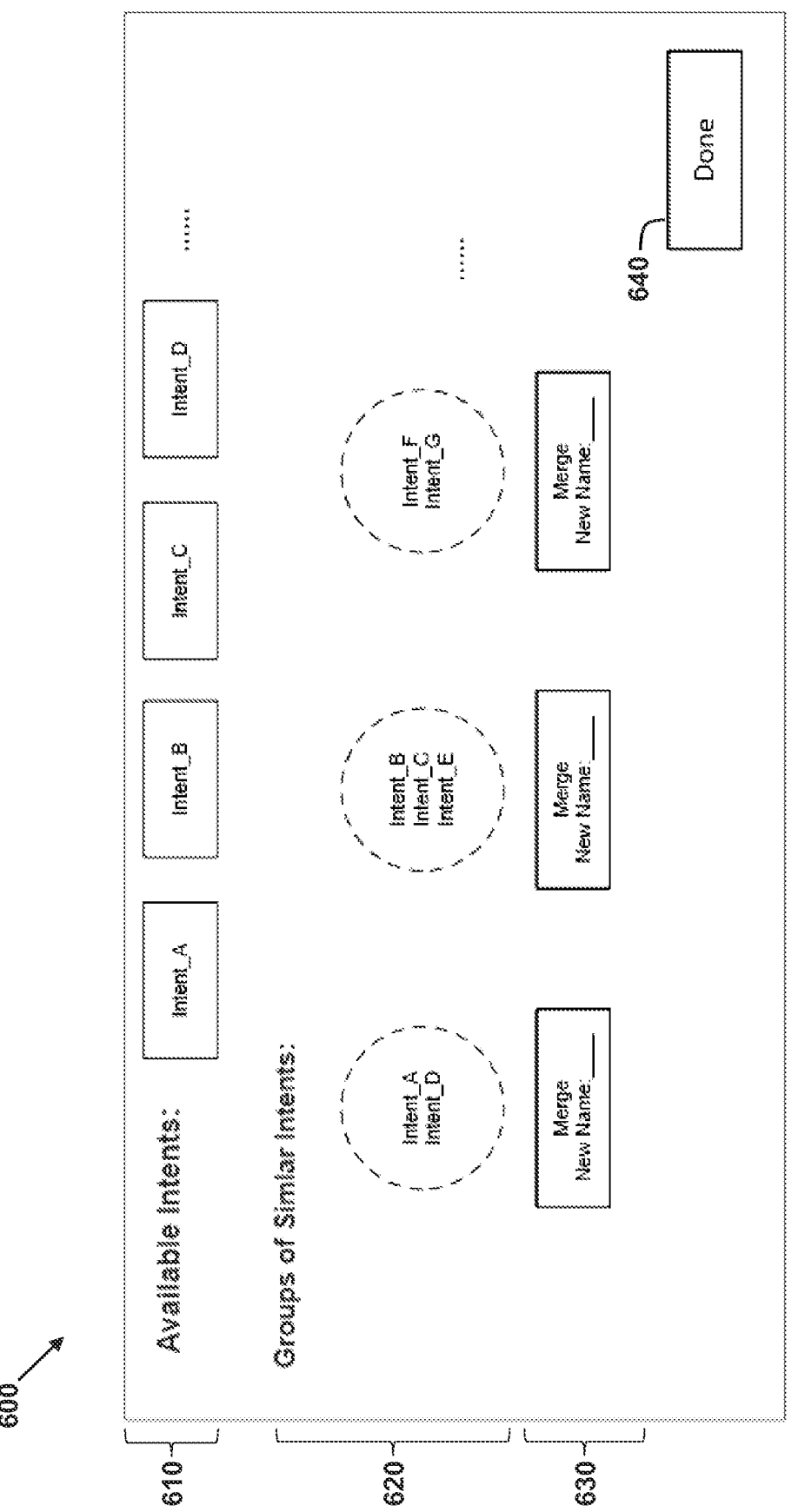
FIG. 7 shows an exemplary graphical user interface for recommending mergers of similar intents.

The method 500 continues with merging the identified group of intents into a single intent in response to a user input (block 530). Particularly, after one or more pairs/groups of similar intents are identified, the processor 110 operates the display 130 to display a graphic user interface that displays the identified pairs/groups of intents to the user. FIG. 7 shows an exemplary graphical user interface 600 for recommending mergers of similar intents. In the graphical user interface 600, the available intents are displayed in a top section 610. In one embodiment, in response to the user clicking one of the available intents clicking each listed intent, the processor 110 displays a popup in the graphical user interface 600 that displays a definition of that intent as well as a certain amount of training sentences. Additionally, the identified pairs/groups of similar intents are displayed to the user in a middle section 620 (e.g., by encircling the names of the intents with a dashed circle). Text entry fields are provided via in a lower section 630, via which the user can provide a name for a new merged intent.

In response to the user confirming any of the recommended mergers (e.g., by entering a new name in the corresponding text entry field), the processor 110 is configured to combine the identified pairs/groups of similar intents into a single new intent by relabeling each training sentence in the plurality of training sentences 160 that is labeled with an intent of the identified pairs/groups of intents with a new intent label (i.e., with the name entered by the user in the corresponding text entry field).

After performing the mergers, the processor 110 repeats the processes of blocks 510 and 520 to recalculate the similarity between the training sentences with the updated intent labels and to provide further recommendations of pairs/groups of intents that are similar to one another and which could be merged. In the graphical user interface 600, the processor 110 updates the available intents that are displayed in the top section 610 and updates the identified pairs/groups of similar intents that are displayed to the user in the middle section 620. The process can continue until the user clicks a "Done" button 640 in the graphical user interface 600 or until there are no more pairs/groups of similar intents detected. The system will then return to the optimization interface 30, via which the user can continue the next step of optimization, with the modified training sentences having the updated intent labels.

FIG. 8 shows a method 700 for reorganizing training sentences for training a natural language understanding model. The method 700 corresponds generally to the "Training Sentence Reorganization" tool introduced above and advantageously helps the user identify potential problems and improve the organization of the various training sentences 160. Particularly, for modern natural language understanding system development, the training sentences are typically collected through cloud sourcing and are input by multiple cloud sourcing workers. However, since different people may have a different understanding of the same data input request and since some requests could be confusing by nature, the same training sentence or the same sentence pattern may occur in the training sentences corresponding to multiple different intents. This can potentially cause problems with the natural language understanding model(s) 122 trained using the training sentences. This problem is especially serious for conversation systems that are designed to support a large number of different intents, or which have inappropriate intent definitions.

The method 700 begins with identifying a sentence pattern corresponding to training sentences labeled with at least two different intents (block 710). Particularly, in response to a corresponding user selection via the graphical user interface, the processor 110 identifies one or more sentence patterns corresponding to training sentences in the plurality of training sentences 160 that are labeled with at least two different intents. These sentence patterns are considered "confusing" sentence patterns because they give conflicting information to the natural language understanding model(s) 122 in training regarding the learning of intent detection.

In at least some embodiments, for each training sentence in the plurality of training sentences 160, the processor 110 determines a sentence pattern of the training sentence by substituting the slot values (i.e., the text in the sentence that is labeled with a slot type) with the slot type label itself (i.e., a name of the slot type). Next, the processor 110 compares sentence patterns to identify the one or multiple sentence patterns corresponding to training sentences that are labeled with at least two different intents. As an example, the sentence pattern "I'd like to travel to {Destination}" might appear in the training sentences for an "Activity Recommendation" intent that provides recommended activities for a travel destination, as well as a "Hotel Recommendation" intent that provides recommended hotels for a travel destination.

As similarly noted above, it should be appreciated that, for a sentence pattern to exist in the training sentences for two different intents or, in other words for two sentences patterns to be the "same," the sentences patterns don't necessarily need to be exactly the same, verbatim. Instead, the processor 110 can determine two sentence patterns as being the "same" if they are within a threshold similarity of one another. For example, in one embodiment, the processor 110 determines a sentence context vector for each sentence pattern using a natural language semantics model (e.g., a neural network). The processor 110 then determines that two sentence patterns are the "same" if their respective sentence context vectors are within a threshold distance from one another.

Figure 9:
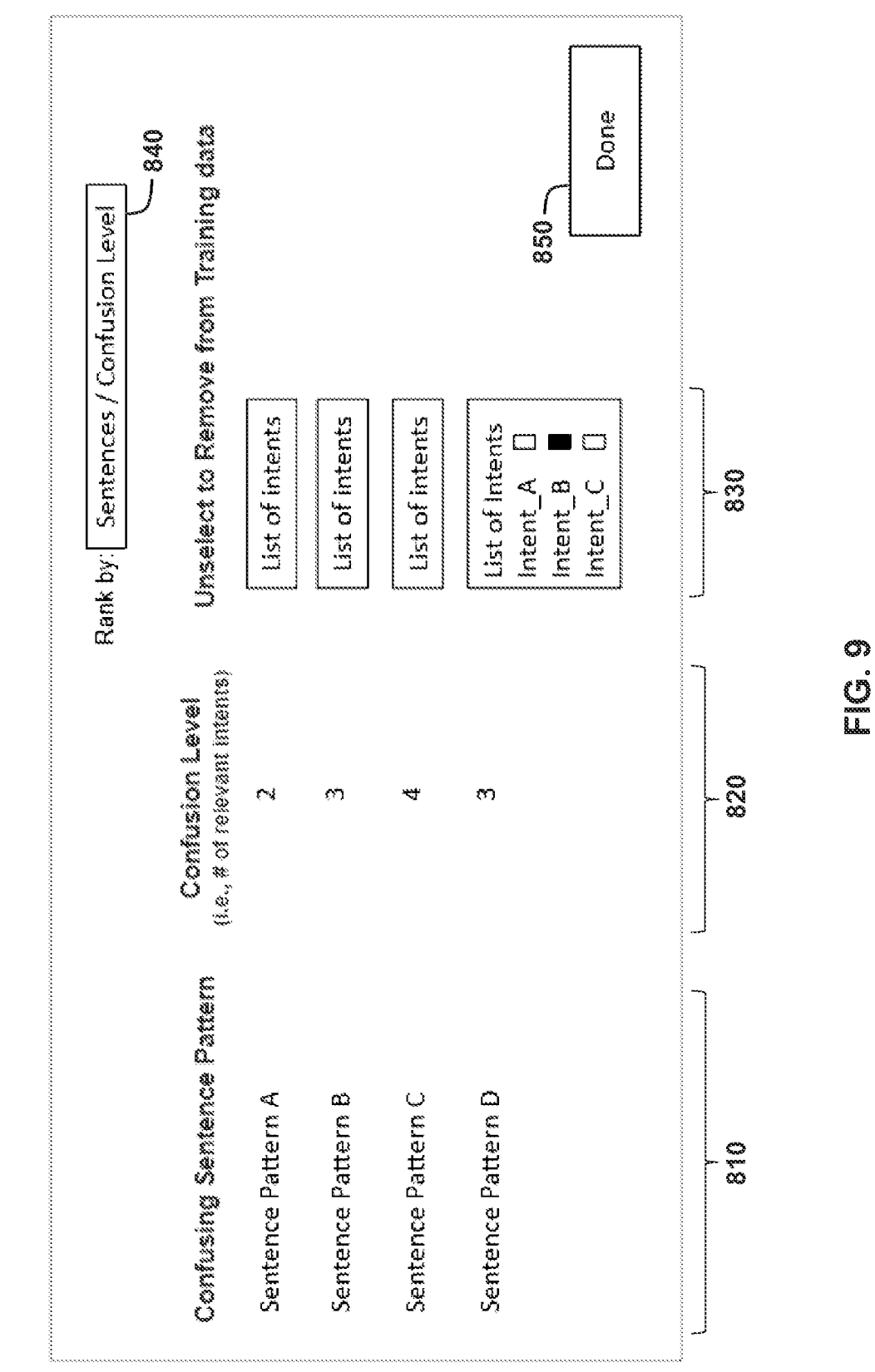
FIG. 9 shows an exemplary graphical user interface for recommending reorganization of training sentences having confusing sentence patterns

The method 700 continues with deleting at least some of the training sentences corresponding to the identified sentence pattern in response to a user input (block 720). Particularly, after one or more sentence patterns are identified as corresponding to training sentences labeled with at least two different intents, the processor 110 operates the display 130 to display a graphic user interface that displays the identified confusing sentence patterns to the user. FIG. 9 shows an exemplary graphical user interface 800 for recommending reorganization of training sentences having confusing sentence patterns. In the graphical user interface 800, the confusing sentence patterns are displayed in a left-hand section 810. Additionally, a confusion level (i.e., the number of intents for which the respective sentence pattern appears in the training sentences) is listed for each confusing sentence pattern in a middle section 820. Selection boxes and/or drop down menus are provided in a right-hand section 830, which list the different intents associated with each confusing sentence pattern. The user can select one or more associated intents for which the training sentences having the confusing sentence pattern should be deleted (or, alternatively, select the intent for which the training sentences should be kept). It some cases, when a sentence pattern is considered too confusing, the user could make selections to delete all training sentences having the confusing sentence pattern.

In response to the user confirming the recommended reorganization of the training sentences for an intent (e.g., by entering a new name in the corresponding text entry field), the processor 110 is configured to delete at least some of the training sentences having the confusing sentence pattern, while keeping other training sentences having the confusing sentence pattern. In one example, the processor 110 deletes the training sentences having the confusing sentence pattern and which are labeled with a first intent, while keeping those labeled with second intent, based on the user inputs. In another example, the processor 110 deletes all training sentences having the confusing sentence pattern and which are labeled with any intent other than a selected intent, based on the user inputs. In a further example, when a sentence pattern is considered too confusing, the processor 110 deletes all training sentences having the confusing sentence pattern, regardless of the intent label, based on the user inputs.

In some embodiments, to make the graphical user interface 800 easier to use, a ranking feature can be activated by selecting a ranking button 840, which allows the user to rank and/or sort the confusing sentence patterns in the graphical user interface 800 by either the confusion level (i.e., the number of intents) or by alphabetical order. Particularly, in response to a user input (e.g., pressing the ranking button 840), the processor 110 is configured to rank the multiple confusing sentence patterns by a respective total number of different intents that include training sentences corresponding to each respective confusing sentence pattern. In response to a further user input (e.g., pressing the ranking button 840 again), the processor 110 is configured to sort the multiple confusing sentence patterns alphabetically (e.g., by text of the sentence pattern).

After the user has performed any desired reorganization of the training sentences, the user can click a "Done" button 850. The system will then return to the optimization interface 30, via which the user can continue with any additional optimizations.

Returning to FIG. 3, the method 200 continues with a step of generating a modified plurality of training sentences by performing the recommended modification to the plurality of training sentences in response to a user input received via a user interface (block 230). Particularly, as already discussed in greater detail above with respect to the methods 300, 500, and 700, the processor 110 is configured to perform the selected and/or recommended modifications to the training sentences (i.e., relabeling or deleting training sentences) in response to user inputs confirming that the modifications should be performed. In practice, the user will often make many different modifications in an iterative manner, which are performed immediately after user confirmation. Thus, it should be understood that the processes of blocks 220 and 230 of the method 200 are performed simultaneously, alternatingly, and/or iteratively, until the user is satisfied with the modifications to the plurality of training sentences 160 and/or the plurality slot-value lists 170.

With continued reference to FIG. 3, the method 200 continues with enabling the user to compare performances of a plurality of different algorithms for training the natural language understanding model (block 240). Particularly, in response to a corresponding user selection via the graphical user interface, the processor 110 operates the display 130 to display a graphic user interface enables the user to selectively train and test different algorithms for the natural language understanding model. A wide variety of natural language understanding algorithm can be supported by the development platform, such as Joint BERT (with CRF), Joint BERT (without CRF), Stack Propagation+BERT, Bi-Model, Attention Encoder-Decoder, or InterNLU. To these ends, in response to corresponding user selections via the graphical user interface, the processor 110 trains a plurality of instances of the natural language understanding model(s) 122 using a plurality of different algorithms. Additionally, the processor 110 determines a performance of each of the plurality of instances of the natural language understanding model(s) 122.

Figure 10:
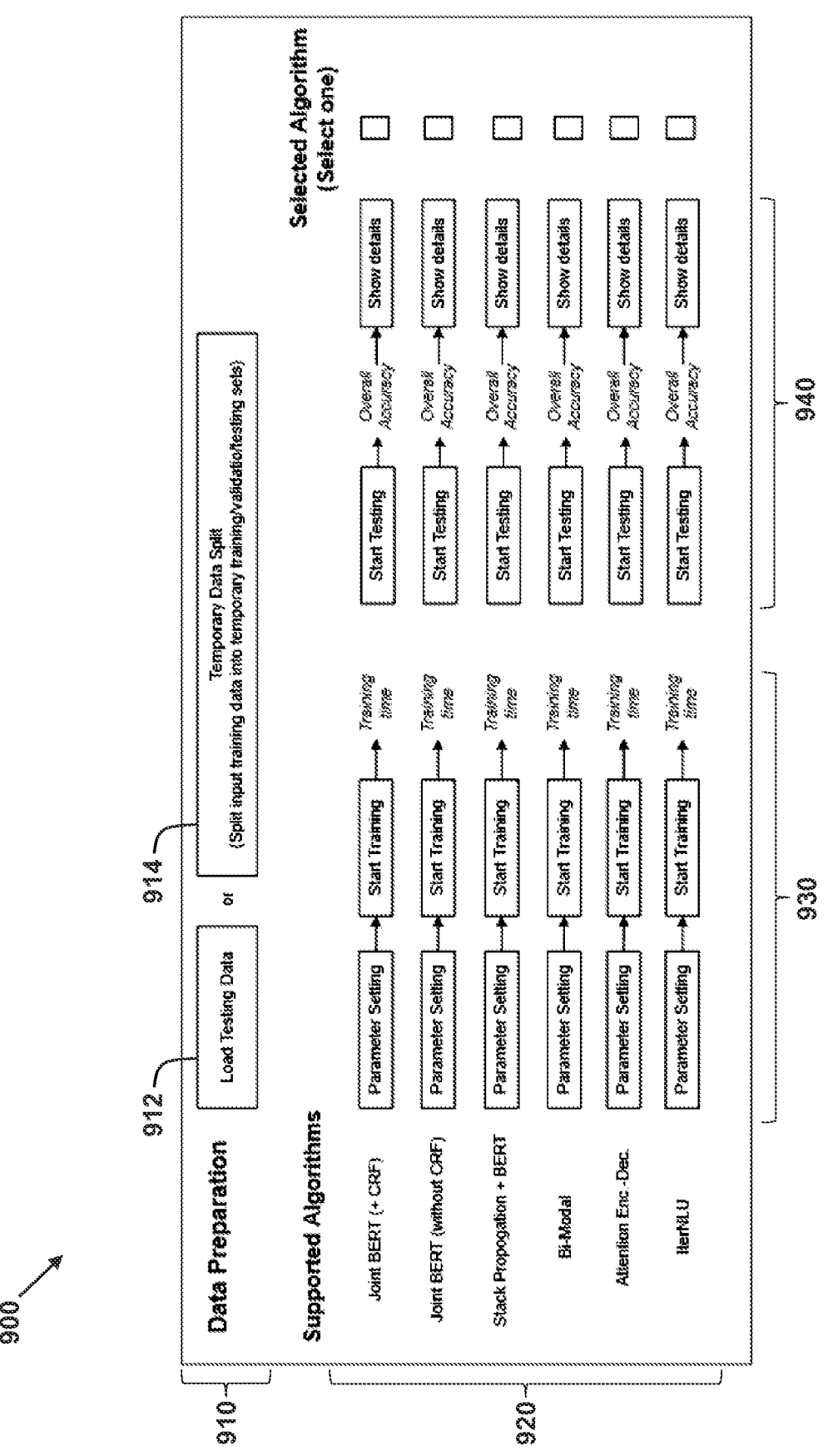
FIG. 10 shows an exemplary graphical user interface for enabling a user to compare performances of a plurality of different algorithms for training a natural language understanding model.

FIG. 10 shows an exemplary graphical user interface 900 for enabling a user to compare performances of a plurality of different algorithms for training a natural language understanding model. The graphical user interface 900 corresponds generally to the "Algorithm Comparison" tool introduced above. A data preparation menu is provided in the top section 910 of the graphical user interface 900. The data preparation menu enables the user to, for the purpose of algorithm evaluation, prepare a training dataset. The graphical user interface 900 provides two ways for the user prepare the training dataset for algorithm comparison. First, the user can either use the "Load Testing Data" button 912 to upload a separate testing dataset, or use the "Temporary Data Split" button 914 to temporarily split the previously provided/generated training data (i.e., the training sentences 160) into a multiple data subsets: a subset of the modified training sentences 160 to be used for training, a subset of the modified training sentences 160 to be used for validation, and a subset of the modified training sentences 160 to be used for testing. These subsets of the modified training sentences 160 are temporarily generated and used for algorithm comparison in this interface only. Particularly, it should be appreciated that, once the user exits graphical user interface 900, the previously provided/generated training data remains unchanged. The benefit of this temporary data split is to allow the user to reserve testing data for the final evaluation (i.e., making the tuning procedure blind to the testing data).

An algorithm comparison interface is provided in a lower section 920 of the graphical user interface. Particularly, once the data is prepared, the user can train an instance of the natural language understanding model(s) 122 with each supported algorithm, by clicking a corresponding "Start Training" button in a training interface section 930. Additionally, the training interface section 930 enables the user to change the algorithm parameters that are used for each supported algorithm by clicking a corresponding "Parameter Setting" button in the training interface section 930 (otherwise the default values will be used). If the plurality of training sentences 160 were temporarily split, the processor 110 trains each respective instance of the natural language understanding model(s) 122 using the corresponding algorithm and using the training subset of the plurality of training sentences 160.

Once the training is done, the time spent on the training procedure is displayed on the interface. Additionally, the user can then click a corresponding "Start Testing" button in a testing interface section 940 to conduct inference on the testing dataset and once done, calculate the statistics. Particularly, if the plurality of training sentences 160 were temporarily split, the processor 110 determines a performance of each respective instance of the natural language understanding model(s) 122 using the validation and/or testing subset of the plurality of training sentences 160 (or otherwise using a separately provided batch of testing data). The resulting overall accuracy (i.e., the ratio of sentences that both the intent detection and slot filling results are correct) is displayed in the testing interface section 940, while the detailed results such as slot F1 can be shown by clicking the "Show details" button in the testing interface section 940.

Once the algorithms are evaluated, the performance of the algorithms can be easily compared by the user using graphical user interface 900. The user can thus select one algorithm based on the achieved performances as the algorithm to use in the final training of the natural language understanding model(s) 122 for the conversation system being developed. Particularly, the processor 110 receives a user input (e.g., a selection of a check box on the right hand side of the graphical user interface 900) indicating a selected algorithm to use in the final training of the natural language understanding model(s) 122, as well as parameter settings for the selected algorithm. After the user has selected an algorithm, the system will then return to the main interface 20 via which the user can proceed with the final training of the natural language understanding model(s) 122.

Returning to FIG. 3, the method 200 continues with training a natural language understanding model using the modified plurality of training sentences (block 250). Particularly, in response to a corresponding user selection via the graphical user interface, the processor 110 trains a final instance of the natural language understanding model(s) 122 using the selected algorithm with the selected parameters and using all of the modified plurality of training sentences 160. If no parameters were selected, then the processor 110 trains the final instance of the natural language understanding model(s) 122 using the selected algorithm with default parameters. If no algorithm was selected, then the processor 110 trains the final instance of the natural language understanding model(s) 122 using a default algorithm and default parameters. If no modifications were made to the training sentences 160, then the processor 110 trains the final instance of the natural language understanding model(s) 122 using the originally provided training sentences 160.

After training the natural language understanding model, the user can return to the main interface 20 and proceed with testing the natural language understanding model. As discussed above, the main interface 20 has a "Testing/Inference" button that, when selected by the user, provides a testing interface via which the user can conduct single-sentence inference or batch testing, in a conventional manner.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for optimizing performance of a neural network-based natural language understanding model, the method comprising:

receiving, with a processor, a plurality of training sentences, each training sentence being labeled with a respective intent from a plurality of intents, at least one portion of at least some of the plurality of training sentences being labeled with a respective slot type from a plurality of slot types;

receiving, with the processor, a plurality of slot-value lists, each slot-value list defining a respective plurality of acceptable values for a respective slot type in the plurality of slot types;

determining, with the processor, at least one recommended modification to the plurality of training sentences based on the plurality of slot-value lists, the at least one recommended modification including relabeling the at least one portion of the respective training sentence in the plurality of training sentences with a different respective slot type from the plurality of slot types;

generating, with the processor, a modified plurality of training sentences by performing the at least one recommended modification to the plurality of training sentences in response to a user input received via a user interface; and training, with the processor, a first natural language understanding model using the modified plurality of training sentences, the first natural language understanding model including a first neural network configured to receive text that includes an input sentence and determine an intent of the input sentence and identify at least one portion of the input sentence corresponding to at least one slot associated with the intent.

2. The method according to claim 1, the determining the at least one recommended modification further comprising:

identifying at least two slot-value lists in the plurality of slot-value lists that are similar to one another, wherein the at least one recommended modification includes combining the at least two slot-value lists into a new slot-value list and relabeling each portion of each training sentence in the plurality of training sentences that is labeled with a slot type corresponding to one of the identified at least two slot-value lists with a new slot type corresponding to the new slot-value list.

3. The method according to claim 2, the identifying further comprising:

comparing the at least two slot-value lists; and identifying the at least two slot-value lists as being similar to one another based on the comparing.

4. The method according to claim 3, the comparing further comprising:

determining an overlap ratio between the respective plurality of acceptable values defined in each of the at least two slot-value lists.

5. The method according to claim 3, the comparing further comprising:

determining a similarity of training sentences in the plurality of training sentences having portions thereof labeled with a slot type corresponding to one of the identified at least two slot-value lists.

6. The method according to claim 3, the comparing further comprising:

determining an overlap ratio between the respective plurality of acceptable values defined in each of the at least two slot-value lists;

determining a similarity of training sentences in the plurality of training sentences having portions thereof labeled with a slot type corresponding to one of the identified at least two slot-value lists; and identifying the at least two slot-value lists in the plurality of slot-value lists as being similar to one another depending on the overlap ratio and the similarity.

7. The method according to claim 1, the determining the at least one recommended modification further comprising:

identifying at least two intents in the plurality of intents that are similar to one another, wherein the at least one recommended modification includes combining the at least two intents into a new intent by relabeling each training sentence in the plurality of training sentences that is labeled with one of the at least two intents with the new intent.

8. The method according to claim 7, the identifying further comprising:

comparing the training sentences of the plurality of training sentences that are labeled with each of the at least two intents with one another; and identifying the at least two intents as being similar to one another based on the comparing.

9. The method according to claim 8, the comparing further comprising:

determining, for each respective training sentence of the plurality of training sentences that is labeled with one of the at least two intents, a respective sentence pattern by replacing each portion of the respective training sentence that is labeled with a respective slot type from the plurality of slot types with a slot type name for the respective slot type; and comparing the respective sentence patterns corresponding to each of the two intents.

10. The method according to claim 9, the comparing further comprising:

determining an overlap ratio between the respective sentence patterns corresponding to each of the two intents.

11. The method according to claim 1, the determining the at least one recommended modification further comprising:

determining, for each respective training sentence of the plurality of training sentences, a respective sentence pattern by replacing each portion of the respective training sentence that is labeled with a respective slot type from the plurality of slot types with a slot type name for the respective slot type; and identifying a sentence pattern corresponding to training sentences in the plurality of training sentences that are labeled with at least two different intents from the plurality of intents, wherein the at least one recommended modification includes deleting at least some of the training sentences in the plurality of training sentences corresponding to the identified sentence pattern.

12. The method according to claim 11, the identifying further comprising:

identifying multiple sentence patterns that in each case correspond to training sentences in the plurality of training sentences that are labeled with at least two intents; and ranking the multiple sentence patterns by a respective total number of different intents that have training sentences corresponding to each respective sentence pattern in the identified multiple sentence patterns.

13. The method according to claim 11, wherein the at least one recommended modification includes deleting all training sentences in the plurality of training sentences corresponding to the identified sentence pattern that are labeled with any intent other than a selected intent.

14. The method according to claim 1 further comprising:

training, with the processor, a plurality of natural language understanding models using a plurality of different algorithms and the modified plurality of training sentences;

determining a performance of each of the plurality of natural language understanding models; and receiving, with the processor, a user input indicating a selected algorithm from the plurality of different algorithms.

15. The method according to claim 14, the training the first natural language understanding model further comprising:

training the first natural language understanding model using the selected algorithm.

16. The method according to claim 14 further comprising:

displaying, on a display, a graphical user interface that indicates the performance of each of the plurality of natural language understanding models, prior to receiving the user input indicating the selected algorithm.

17. The method according to claim 14, wherein:

the plurality of natural language understanding models are trained using a first subset of the modified plurality of training sentences; and the performance of each of the plurality of natural language understanding models is determined using a second subset of the modified plurality of training sentences.

18. The method according to claim 1 further comprising:

displaying, on a display, a graphical user interface that indicates the at least one recommended modification.

19. A non-transitory computer-readable medium that stores a computer program for optimizing performance of a neural network-based natural language understanding model that, the computer program having program instructions that, when executed by a processor, cause the processor to:

receive a plurality of training sentences, each training sentence being labeled with a respective intent from a plurality of intents, at least one portion of at least some of the plurality of training sentences being labeled with a respective slot type from a plurality of slot types;

determine a recommended modification to the plurality of training sentences by identifying at least two intents in the plurality of intents that are similar to one another, the recommended modification including combining the at least two intents into a new intent by relabeling each training sentence in the plurality of training sentences that is labeled with one of the at least two intents with the new intent;

generate a modified plurality of training sentences by performing the recommended modification to the plurality of training sentences in response to a user input received via a user interface; and train a first natural language understanding model using the modified plurality of training sentences, the first natural language understanding model including a first neural network configured to receive text that includes an input sentence and determine an intent of the input sentence and identify at least one portion of the input sentence corresponding to at least one slot associated with the intent.

20. A method for optimizing performance of a neural network-based natural language understanding model, the method comprising:

receiving, with a processor, a plurality of training sentences, each training sentence being labeled with a respective intent from a plurality of intents, at least one portion of at least some of the plurality of training sentences being labeled with a respective slot type from a plurality of slot types;

determining, with the processor, a recommended modification to the plurality of training sentences, the recommended modification including at least one of (i) relabeling a respective training sentence in the plurality of training sentences with a different respective intent from the plurality of intents, (ii) relabeling the at least one portion of the respective training sentence in the plurality of training sentences with a different respective slot type from the plurality of slot types, and (iii) deleting a training sentence in the plurality of training sentences;

generating, with the processor, a modified plurality of training sentences by performing the recommended modification to the plurality of training sentences in response to a user input received via a user interface;

training, with the processor, a plurality of natural language understanding models using a plurality of different algorithms and the modified plurality of training sentences, each of the plurality of natural language understanding models including a neural network configured to receive text that includes an input sentence and determine an intent of the input sentence and identify at least one portion of the input sentence corresponding to at least one slot associated with the intent;

determining a performance of each of the plurality of natural language understanding models; and receiving, with the processor, a user input indicating a selected algorithm from the plurality of different algorithms.

* * * * *